United States Patent [19]
Steiger

[11] 3,908,376
[45] Sept. 30, 1975

[54] HYDROSTATIC TRANSMISSION

[75] Inventor: Anton Steiger, Illnau, Switzerland

[73] Assignee: Sulzer Brothers Limited, Winterthur, Switzerland

[22] Filed: May 13, 1974

[21] Appl. No.: 469,541

[30] Foreign Application Priority Data
May 17, 1973   Switzerland.......................... 7031/73

[52] U.S. Cl. ........................ 60/428; 60/486; 60/487
[51] Int. Cl.² .......................................... F15B 13/09
[58] Field of Search .............. 60/421, 428, 486, 487

[56] References Cited
UNITED STATES PATENTS

| | | | |
|---|---|---|---|
| 1,835,976 | 12/1931 | Ernst et al. ........................... | 60/428 |
| 2,042,247 | 5/1936 | Blood.................................... | 60/375 |
| 2,874,682 | 2/1959 | Vander Kaay..................... | 60/388 X |
| 3,386,344 | 6/1968 | Junck et al. ....................... | 60/421 X |

Primary Examiner—Edgar W. Geoghegan
Attorney, Agent, or Firm—Kenyon & Kenyon Reilly Carr & Chapin

[57] ABSTRACT

At least one fixed-delivery pump is interconnected in parallel with a variable-delivery pump to drive a motor. A control means serves to connect or disconnect each fixed-delivery pump to or from the motor in response to the variable-delivery pump reaching one or the other of two extreme values of operation. The control means uses a rotary valve to interconnect the fixed delivery pumps which valve is rotated off the adjusting means of the variable-delivery pump via a projection and a formed link guide slot in the rotary valve.

11 Claims, 4 Drawing Figures

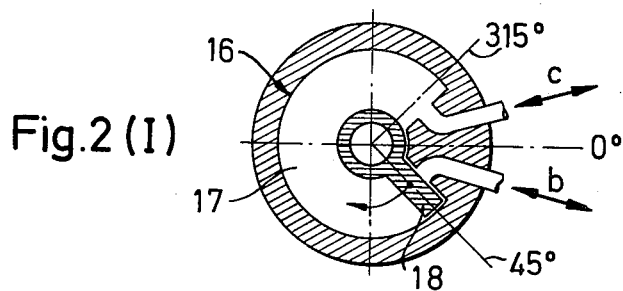
Fig.2 (I)
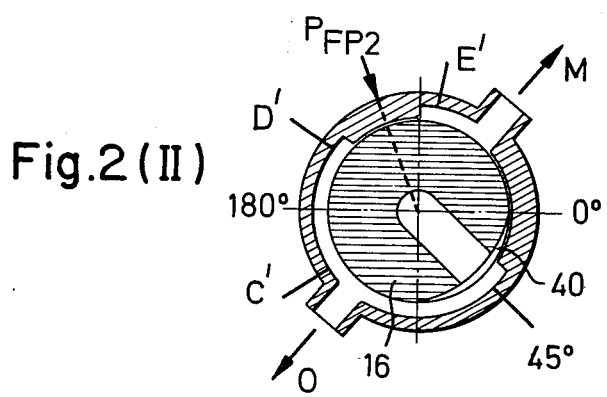
Fig.2 (II)
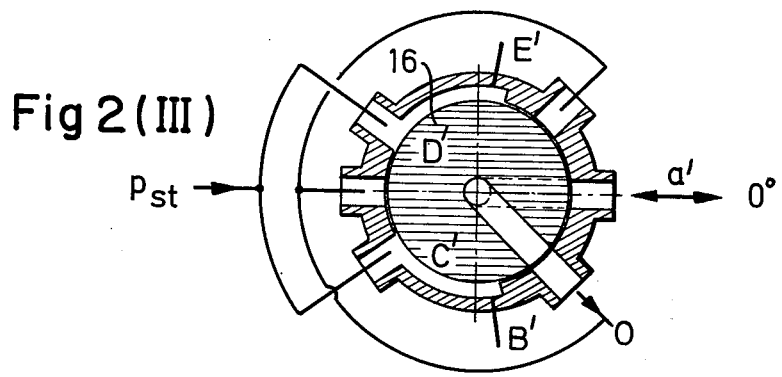
Fig 2 (III)
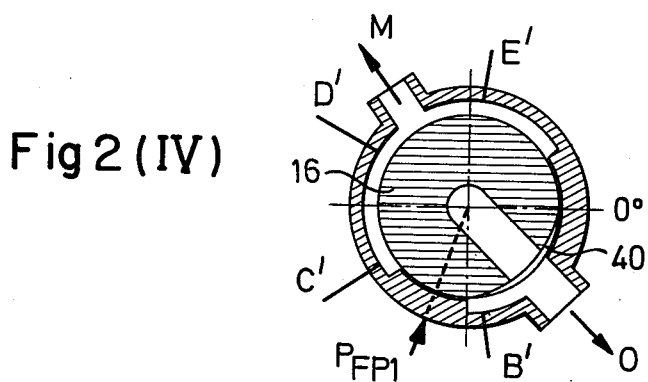
Fig 2 (IV)

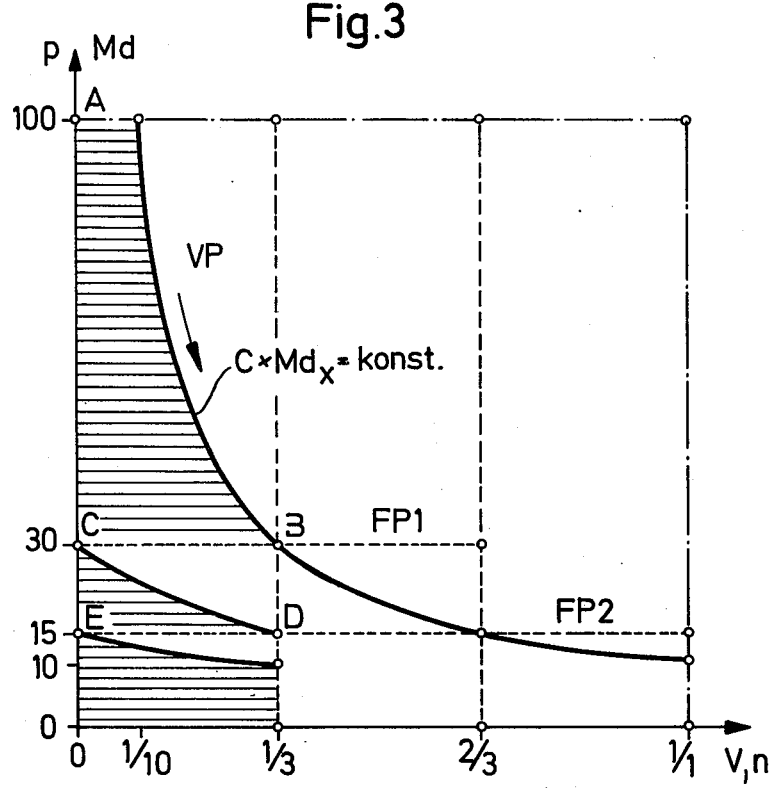
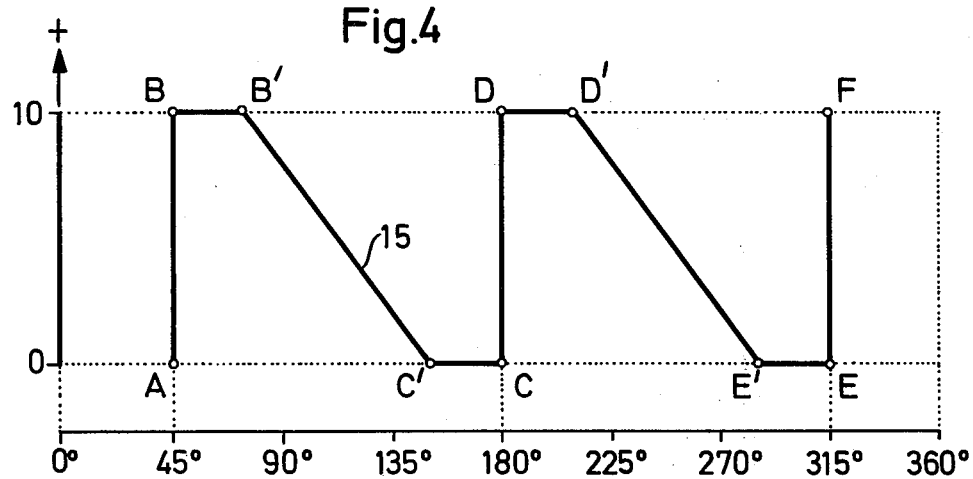

HYDROSTATIC TRANSMISSION

This invention relates to a hydrostatic transmission.

Hydrostatic transmissions have been known to use a motor and a variable-delivery pump with a variable delivery volume, the output of which is connected to the motor. Generally, these hydrostatic transmissions provide for an infinitely variable change of a transmission ratio and a high degree of flexibility as regards the relative position of the input and output. However, these transmissions have the disadvantage that variable-delivery pumps are relatively expensive. Furthermore, these pumps experience losses due to oil leakage which are governed mainly by the operating pressure and not by the effectively transmitted power. The losses are determined mainly by the size of the variable-delivery pump. Also, when used as a vehicle transmission, these transmissions have been relatively large and space consuming.

Accordingly, it is an object of the invention to provide a hydrostatic transmission which permits the use of a relatively small variable-delivery pump when used as a vehicle transmission for a given effective output.

It is another object of the invention to reduce the cost of a hydrostatic transmission.

It is another object of the invention to increase the efficiency of a hydrostatic transmission when operating at a low delivery rate or at low speeds.

Briefly, the invention provides a hydrostatic transmission having a hydraulic motor and a variable-delivery pump operable between two extreme values with at least one fixed-delivery pump with an invariable delivery rate which is connected to the motor in parallel with the variable-delivery pump. The transmission is also provided with a control means for adjusting the delivery rate of the variable-delivery pump. This control means also serves to connect or disconnect the fixed-delivery pump to or from the motor at times when the delivery rate of the variable-delivery pump has reached an extreme value. The control means also serves to simultaneously cause a changeover of the variable-delivery pump to the other extreme value.

The fixed-delivery pump is used to increase the delivery rate of the transmission and is of simple construction. To this end, the fixed-delivery pump can be constructed for delivery heads which are smaller than those of the variable-delivery pump. Since the pump is connected only when required, its leakage losses will have no effect when the pump is not connected. Such leakage losses do not therefore reduce the efficiency of the transmission when operating with a low delivery rate so that a higher efficiency can be achieved for the entire plant.

The control means may use a hydraulic adjusting means for adjusting the delivery rate of the variable-delivery pump. In such a case, the hydraulic adjusting means is connected in series with a changeover means which causes automatic movement of the adjusting means into a second end position after reaching a first end position. The procedure which accompanies the connection or disconnection of the fixed-delivery pump can be substantially simplified by such a step.

The changeover means may contain a changeover valve and a control valve operated in dependence on the adjusting movement of the variable-delivery pump and adapted to trigger operation of the changeover valve when the adjusting movement reaches one end position. In this way, automation of the operation of connecting and disconnecting can be achieved with simple means.

A blocking means can also be provided for blocking the adjusting device as soon as an adjusting movement has ended. Unintentional adjustment of the delivery rate of the variable-delivery pump can thus be prevented during operation.

A second control valve in the form of a rotary valve may also be used to effect the connection or disconnection of the fixed-delivery pump. Such a rotary valve can be connected to the adjusting means to be operated in dependence on the movements of the adjusting means corresponding to the operating value of the variable-delivery pump. In this case, use is made of a slotted link guide in the rotary valve in order to program the motions of the valve relative to the operation of the variable-delivery pump.

These and other objects and advantages of the invention will become more apparent from the following detailed description and appended claims taken in conjunction with the accompanying drawings in which:

FIG. 2 illustrates sections on the planes I, II, III and IV of a rotary control valve of FIG. 1;

Figure 1:
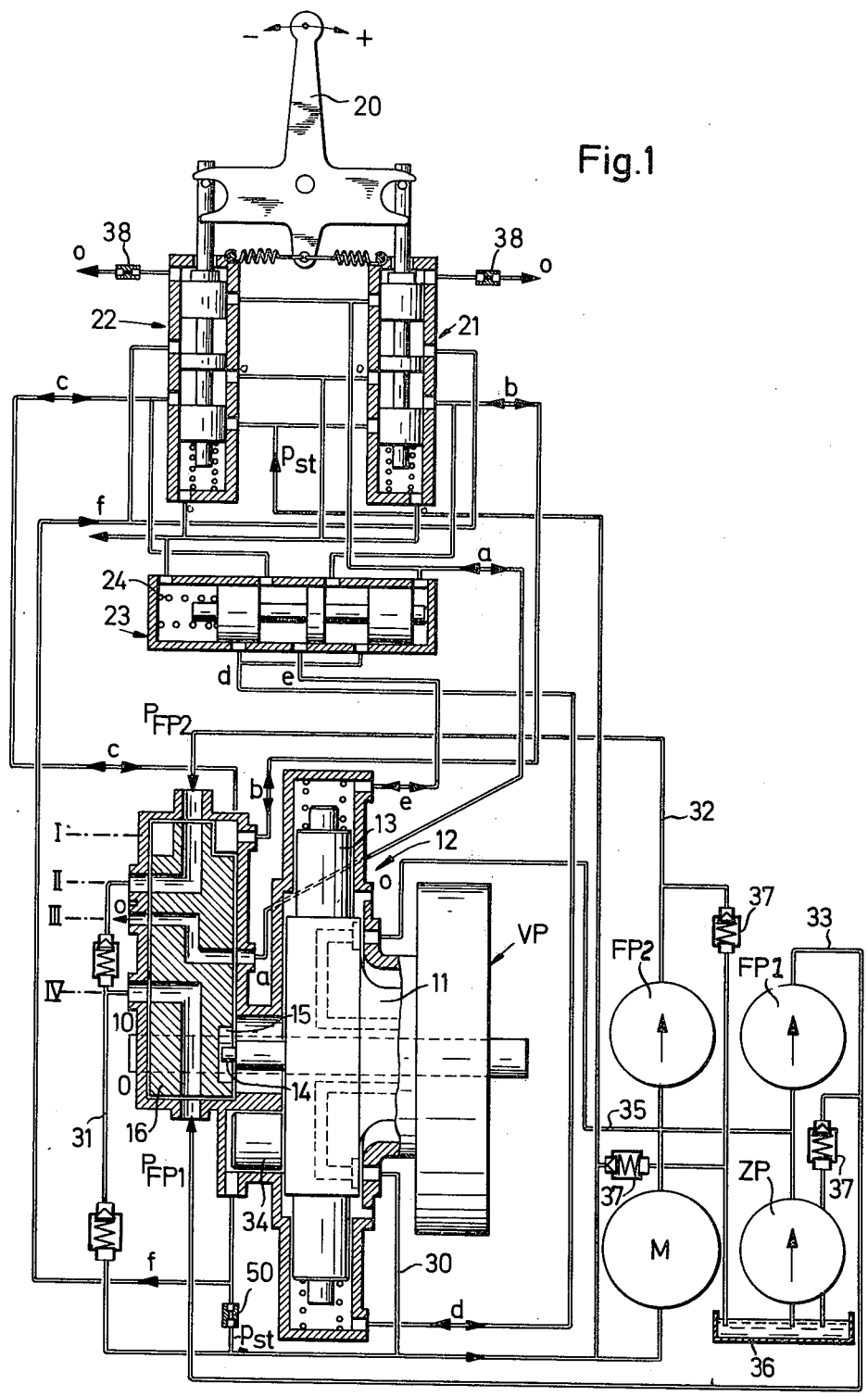
FIG. 1 illustrates a circuit diagram of a transmission according to the invention.

FIG. 3 diagrammatically illustrates a method of operation of the transmission of FIG. 1; and FIG. 4 is a diagrammatic development of the path of a slotted link guide of the control valve of FIG. 1.

Referring to FIG. 1, the hydraulic transmission comprises a volumetric hydraulic motor M, a variable-delivery pump VP, two fixed-delivery pumps FP1, FP2 and a feeder pump ZP. The variable-delivery pump VP is a hydraulic piston pump with a pintle whose eccentricity is variable and about which an annular cylinder casing moves. The pump VP is connected by a conduit 30 to a delivery line 31 of the motor M in order to deliver a pressurized medium thereto. Hydrostatic piston machines of this kind are known. The essential feature in the present context is that the quantity of hydraulic pressure medium delivered by the variable delivery pump VP depends on the eccentricity of the pintle 11. In FIG. 1, this eccentricity is variable between two positions 0 and 10. The pump VP is thus operable in a range between two extreme values corresponding to positions 0 and 10.

In order to operate the various pumps VP, FP1, FP2, a control means is incorporated into the transmission. This control means includes a hydraulic adjusting means 12 which is mounted on the pintle 11 of the pump VP for adjusting the delivery rate of the pump VP between the two extreme values 0, 10. This adjusting means 12 contains pistons 13 which are movable in cylinders, hydraulic pressure medium being supplied to or removed from the pistons 13 through ducts $d$ and $e$. Depending on the supply, a movement of the pistons 13 and accordingly of the pintle 11 occurs in one or the other directions.

In order to reverse the adjusting means 12, the control means uses a changeover means which is connected in series with the adjusting means 12 for moving the adjusting means 12 from a first end position to a second end position in order to change over the pump VP from one extreme value 0, 10 to the other. This changeover means includes a changeover valve 23 which is connected to the ducts $d$, $e$ leading to the cylinders of the adjusting means 12 and a control valve 16.

The changeover valve 23 includes a spool which is biased by a spring 24 to the right as viewed in FIG. 1. The spool, in turn, cooperates with the ducts $d$, $e$ to define various chambers for emitting a pressurized medium to one of the ducts $d$, $e$ while receiving a return flow through the other duct $d$, $e$.

The control valve 16 is connected to the pump VP via the adjusting means 12 in order to respond to changes in the delivery rate of the pump VP, that is, to respond when the pump VP is changed over upon reaching an extreme value 0, 10. To this end, the adjusting means 12 has a projection 14 which is guided in a track of a slotted link guide 15 of the control valve 16. This track is of a shape as indicated in FIG. 4 which also shows various stations A-F for the projection 14. The control valve 16 is in the form of a rotary spool which is disposed within a suitable casing and which has the guide 15 integrally formed therein. The projection 14 thus serves to rotate the valve 16 in response to movements of the adjusting means 12 between the end positions thereof. The rotary spool control valve 16 has different ducts in four planes I-IV, the configuration of which is shown in FIG. 2. In plane I, the valve 16 contains a disc-shaped cylinder chamber 17 in which a vane 18 on the valve 16 is sealingly mounted to divide the chamber 17 into two sections. Each section of the chamber 17 communicates with a duct $b$, $c$ to receive or emit a pressurized medium. Depending on whether pressure is supplied through the duct $b$ or $c$, the rotary spool valve 16 is influenced by a torque with the appropriate direction of rotation.

The control valve 16 is connected to the changeover valve 23 via a duct $a$ to initiate operation of the valve 23 in response to the pump VP reaching one of the extreme values 0, 10 in order to cause the valve 23 to move the adjusting means from one end position to the other. To this end, the rotary spool control valve has a duct in plane III which is adapted to receive pressurized medium $p_{st}$ for delivery to the duct $a$. The duct $a$, in turn, is connected to the valve 23 at one end of the spool in order to deliver the pressurized medium to act against the spring 24 and push the spool to the left as viewed. This, in turn, causes a reversal of the flows in the ducts $d$, $e$ to the adjusting means 12.

The control means also includes a control lever 20 and two identical control valves 21, 22 for selectively connecting and disconnecting a fixed delivery pump FP1, FP2 to the motor M in response to the pump VP reaching one of the extreme values 0, 10. Each control valve 21, 22 is connected to the delivery line of the motor M in parallel with the motor M in order to receive a part of the flow of pressurized medium being delivered to the motor M. Each valve 21, 22 also serves to control the supply of pressurized medium to the adjusting means 12. That is, each valve 21, 22 is connected via a duct $b$, $c$ to the changeover valve 23 in order to deliver a flow of pressurized medium thereto. Also, each valve 21, 22 is connected via the same ducts $b$, $c$ to the chamber 17 of the rotary spool valve 16 located in plane I. The connecting lever 20 is connected to the valves 21, 22 to operate one while the other remains inoperable. Thus, upon actuation of one valve 21, 22, the changeover valve 23 is able to operate in order to reverse the adjusting means 12 and the rotary spool valve 16 is rotated into a position to institute the connection or disconnection of a fixed pump FP1, FP2.

Each valve 21, 22 also connects to the duct $a$ to receive pressurized medium from the rotary valve 16. The duct $a$ connects to each valve 21, 22 at an upper end to direct pressurized medium behind the spool of each valve when a valve 21 or 22 is activated by the control lever 20. The pressure acts in opposition to a spring used to bias the spool upwardly. In this way, a self-holding means is provided for retaining the valve 21, 22 in position during changeover of the pump VP until completion of the changeover.

As shown in FIG. 1, the fixed-delivery pump FP1 is connected to the delivery line 31 of the motor M via a conduit 33 and a control duct in the plane IV of the valve 16. The fixed-delivery pump FP2 is similarly connected to the motor M via a conduit 32 and a control duct in the plane II of the valve 16.

The delivery line 31 also has two conduits $p_{st}$ which extend therefrom to carry control pressure for control purposes. One of these conduits extends to a blocking means 34 for blocking the adjusting means 12 upon movement of the adjusting means 12 into each of the end positions. The blocking means 34 is in the form of a piston which can be pressed by the pressurized medium against the adjusting means 12 to hold the adjusting means 12 in place. The other conduit extends to the control valves 21, 22.

Referring to FIG. 1, the pumps VP, FP1, FP2 are connected to a common feeder line 35 into which the feeder pump ZP feeds from a reservoir 36. The individual pumps are provided with bypass valves 37 in known manner.

All the connecting ports of the elements which extend into the outflow and are therefore connected to the reservoir 36 are denoted by reference 0 in FIGS. 1 and 2. In addition, the outflow conduits of the control valves 21, 22 contain restrictors 38 and the conduit $p_{st}$ to the blocking means 34 contains a restrictor 50.

As shown in FIG. 1, an outlet duct $f$ is connected to the conduit $p_{st}$ leading to the blocking means 34 and to the control valves 21, 22 at places intermediately of the valve spools. In this way, the blocking means 34 can be released upon downward movement of a spool of a control valve 21, 22 as the duct $f$ is the brought into communication with an outflow port 0.

The individual connecting ports of the elements of the transmission are connected to each other via the ducts $a$–$f$.

The principle of operation of the transmission is apparent from FIG. 3 which shows the traction hyperbola denoting the relationship between the speed of rotation $n$ of the motor M (i.e. the speed of travel) and its torque Md such relationship being typical for a vehicle drive. This means that the motor M always delivers a constant output irrespective of speed. The same curve also applies to the relationship between the pump pressure $p$ and the delivery volume $v$. According to this relationship, the variable-delivery pump VP operates on its own up to one-third of the maximum speed of the motor M. At the same time, the pump VP will supply the maximum torque in these circumstances. After the first third of the speed $n$ max has been exceeded, i.e. when the pump pressure is only 30% of the maximum pressure of the variable-delivery pump, the fixed-delivery pump FP1 will be connected and the variable-delivery pump is simultaneously set back to a delivery rate 0 (corresponding to the eccentricity 0 in FIGS. 1 and 4). Any further increase of the speed of rotation of the motor is obtained by a renewed increase of the delivery of the variable-delivery pump VP by increasing its eccentricity from 0 towards 10. After the second third of the speed of rotation has been exceeded, the second fixed-delivery pump FP2 is connected and the variable-delivery pump is again set back to 0.

As long as the control lever 20 is in the middle position, the duct $f$ is closed by the two control valves 21, 22. The pressure which is supplied via the conduit $p_{st}$ acts fully on the blocking piston 34 via the restrictor 50 so that the adjusting means is retained. If the control lever 20 is moved to the right (FIG. 1) for an intentional increase of the speed of rotation, the duct $f$ and therefore the blocking piston 34 will be relieved. Pressure simultaneously passes from the conduit $p_{st}$ to the duct $b$ and from there, on the one hand, via the changeover valve 23 into the duct $d$ so that the adjusting device 12 begins to move upwardly. The eccentricity of the variable-delivery pump VP and, therefore, its delivery rate are thus increased. Pressure simultaneously passes from the conduit $p_{st}$ through the conduit $b$ into the cylinder chamber 17 on the plane I of the rotary spool control valve 16 and acts on the vane 18. However, the slotted link track of the guide 15 prevents rotation of the control spool. It has been assumed that the projection 14 is disposed in the section A, B of the slotted link track (see FIG. 4).

When the adjusting means 12 has reached the top position, the control spool valve 16 is able to rotate freely and transverses the zone B-B' of the slotted link track (FIG. 4). Further rotation of the control spool 16 is prevented after the end B' of the track 15 has been reached. In this position, pressure passes in the plane III from the control conduit $p_{st}$ into the conduit $a$ with the consequence that the spool of the changeover valve 23 is moved to the left against the force exerted by the spring 24 in FIG. 1. Pressure from the conduit $a$ simultaneously acts on the top end face of the spool of the control valve 21 and maintains this in the depressed position until the changeover procedure is completed, i.e. until the variable-delivery pump VP has reached its other extreme position, in this case having the eccentricity 0. The shape of the lever 20 prevents operation of the other control valve 22.

Since the changeover valve 23 has reversed the connections of the adjusting means 12, the latter moves downwardly together with the piston 13. The projection 14 simultaneously moves along the section B', C' of the slotted link track 15 (FIG. 4). The vane 18 then rotates the rotary valve 16 in the clockwise direction. As a result, the fixed-delivery pump FP1 is connected to the motor delivery line 31 in the sectional plane IV. To prevent this connection from taking place too abruptly, the spool of the control valve 16 is provided with a restrictor duct 40.

When the adjusting means 12 with the projection 14 reaches the bottom position, the spool valve can rotate further into the position 180°, the projection 14 traversing the section C'–C in the slotted line track. This causes the duct $a$ to be relieved in the plane III. The spool of the changeover valve 23 then returns into its starting position under the effect of the spring 24. The adjusting means 12 begins to move upwardly so that the delivery rate of the pump VP is increased. The spool of the control valve 21 is then released to maintain the speed obtained.

The second fixed delivery pump FP2 is connected in like manner after the section C, D' of the track 15 has been traversed, unless the control lever 20 has in the meantime been moved into the middle position. The consequence of this movement would be that the supply of pressure medium to the associated cylinder chamber of the adjusting means 12 would be interrupted and the blocking piston 34 would be simultaneously pressed.

Connection of the fixed delivery pump FP2 is provided through the duct in the plane II of the control valve 16, the spool of the said control valve in this case also being provided with a restrictor duct 40 to prevent abrupt connection.

The control lever 20 of FIG. 1 is pivoted to the left for an intentional reduction of the speed of rotation of the motor and therefore of the delivery rate of the pump system. In this case, the process described hereinabove is reversed, the projection 14 moving through he track 15 in the opposite direction.

The invention thus provides a hydrostatic transmission of relatively simple and compact construction which utilizes a small variable-delivery pump. The smaller variable-delivery pump is not only less expensive to purchase, but also has lower leakage losses and therefore higher efficiency when the transmission operates with a low delivery rate or at low speeds.

What is claimed is:

1. A hydrostatic transmission comprising
   a motor;
   a variable-delivery pump having a variable-delivery volume and being connected to said motor for driving said motor, said pump being operable in a range between two extreme values;
   at least one fixed-delivery pump having an invariable-delivery rate and being selectively connected to said motor in parallel with said variable-delivery pump; and
   a control means for adjusting the delivery rate of said variable-delivery pump and for selectively connecting and disconnecting said fixed delivery pump to said motor in response to said variable-delivery pump reaching one of said extreme values, said control means simultaneously causing a changeover of said variable-delivery pump from said one extreme value to the other extreme value upon said latter pump reaching said one extreme value.

2. A hydrostatic transmission as set forth in claim 1 wherein said control means includes an adjusting means for adjusting the delivery rate of said variable-delivery pump, and a changeover means connected in series with said adjusting means for moving said adjusting means from a first end position into a second end position to change over said variable-delivery pump from one extreme value to the other extreme value and for selectively connecting and disconnecting said fixed delivery pump to said motor in response to movement of said adjusting means from one of said end positions.

3. A hydrostatic transmission as set forth in claim 2 wherein said changeover means includes a changeover valve connected to said adjusting means and a control valve, said control valve being connected to said variable-delivery pump to respond to changes in the delivery rate of said variable delivery pump, said control valve being connected to said changeover valve to initiate operation of said valve in response to said variable-delivery pump reaching one of said extreme values to cause said valve to move said adjusting means from one end position to the other end position.

4. A hydrostatic transmission as set forth in claim 3 wherein said control valve is a rotary valve having a slotted link guide, and said adjusting means includes a projection projecting into said link guide to rotate said rotary valve in response to movements of said adjusting means between said end positions.

5. A hydrostatic transmission as set forth in claim 4 wherein said control valve further includes a disc-shaped cylinder chamber and a movable vane on said rotary valve sealingly mounted in said chamber to divide said chamber into two sections, said changeover valve being connected to said chamber on opposite sides of said vane to deliver pressurized medium from said changeover valve to a selective one of said sections of said chamber.

6. A hydrostatic transmission as set forth in claim 5 wherein said rotary valve includes a control duct for connecting and disconnecting said fixed-delivery pump to and from said motor.

7. A hydrostatic transmission as set forth in claim 2 which further comprises a blocking means for blocking said adjusting means upon movement of said adjusting means into each of said end positions.

8. A hydrostatic transmission as set forth in claim 2 which further includes a delivery line connected between each said pump and said motor for delivering pressurized medium to said motor, and wherein said control means further includes a control valve connected to at least one of said delivery line for controlling the supply of pressurized medium to said adjusting means, and a control lever connected to said control valve to actuate said valve.

9. A hydrostatic transmission as set forth in claim 8 wherein said control valve includes a self-holding means for retaining said valve in position during changeover of said variable-delivery pump until completion of changeover.

10. A hydrostatic transmission as set forth in claim 9 wherein said control means includes two of said control valves, said control lever being selectively connected to said control valves to operate one valve while the other valve remains inoperable.

11. A hydrostatic transmission comprising
a motor having a delivery line;
a variable-delivery pump having a variable-delivery volume and being connected to said motor for driving said motor, said pump being operable in a range between two extreme values;
at least one fixed-delivery pump having an invariable-delivery rate and being selectively connected to said motor in parallel with said variable-delivery pump;
an adjusting means for adjusting the delivery rate of said variable-delivery pump between said extreme values;
a changeover valve connected to said adjusting means to reverse an adjustment of the delivery rate of said variable-delivery pump;
a first control valve connected between said changeover valve and said delivery line of said motor to deliver a flow of pressurized medium to said changeover valve to activate said changeover valve; and
a second control valve connected to said adjusting means between said fixed-delivery pump and said delivery line for connecting and disconnecting said fixed-delivery pump to and from said delivery line, said second control valve being connected to said first control valve to receive pressurized medium therefrom for activation of said second control valve to connect and disconnect said fixed-delivery pump to and from said delivery line in response to said adjusting means moving into one of two end positions, each end position corresponding to an extreme value of said variable-delivery pump.

* * * * *